(12) United States Patent
Nakayama

(10) Patent No.: US 6,942,911 B2
(45) Date of Patent: Sep. 13, 2005

(54) DISPLAY MEMBER HAVING METALLIC LUSTER

(75) Inventor: Akihiko Nakayama, Gotemba (JP)

(73) Assignee: 3M Innovative Properties Company, St. Paul, MN (US)

( * ) Notice: Subject to any disclaimer, the term of this patent is extended or adjusted under 35 U.S.C. 154(b) by 226 days.

(21) Appl. No.: 10/258,685

(22) PCT Filed: Apr. 20, 2001

(86) PCT No.: PCT/US01/12823
§ 371 (c)(1),
(2), (4) Date: Oct. 25, 2002

(87) PCT Pub. No.: WO01/82269
PCT Pub. Date: Nov. 1, 2001

(65) Prior Publication Data
US 2004/0113899 A1 Jun. 17, 2004

(30) Foreign Application Priority Data
Apr. 27, 2000 (JP) ........................................ 2000-132895

(51) Int. Cl.[7] .......................... A61F 13/02; B32B 7/12; B32B 15/08
(52) U.S. Cl. ..................... 428/40.9; 428/42.1; 428/213; 428/308.4; 428/352; 428/354; 428/355 AC; 428/355 N; 428/461; 428/463
(58) Field of Search ................................ 428/347, 349, 428/352, 355 AC, 355 N, 461, 463, 343, 344, 354, 213, 308.4, 40.9, 41.1, 41.7, 42.1

(56) References Cited

U.S. PATENT DOCUMENTS

| | | | |
|---|---|---|---|
| 2,804,416 A | * 8/1957 | Phillipsen | 428/336 |
| 4,125,665 A | * 11/1978 | Bemmels et al. | 428/352 |
| 4,169,184 A | * 9/1979 | Pufahl | 428/337 |
| 4,275,116 A | * 6/1981 | Kratschmer | 428/336 |
| 5,164,245 A | * 11/1992 | Suzuki | 428/201 |
| 5,320,869 A | 6/1994 | Eisfeller et al. | 427/250 |

FOREIGN PATENT DOCUMENTS

| | | | | |
|---|---|---|---|---|
| EP | 0 875 300 A2 | | 11/1998 | ............ B05D/5/06 |
| JP | 04118230 | | 4/1992 | ............ B32B/15/08 |
| JP | 2000-043082 | * | 2/2000 | |
| JP | 2000043082 | | 2/2000 | ............ B29C/45/14 |
| JP | 2000094575 | | 4/2000 | ............ B32B/15/08 |

* cited by examiner

Primary Examiner—Kevin R. Kruer
(74) Attorney, Agent, or Firm—James D. Withers; Jean A. Lown

(57) ABSTRACT

A display member having metallic luster is disclosed. The display member includes a substrate, a metallic layer, and a transparent layer in sequence with one another. The display member further includes an adhesive layer on the substrate opposite the metallic layer. The metallic layer is an indium vapor deposition film provided on a surface of the transparent layer. The indium vapor deposition film has a visible ray transmittance of not more than 6% and a thickness of not more than 600 angstroms.

19 Claims, 2 Drawing Sheets

DISPLAY MEMBER HAVING METALLIC LUSTER

The present application is the national stage application of International Patent Application PCT/US01/12823 filed on Apr. 20, 2001, and claiming the benefit of priority to Japanese Patent Application No. 2000-132895 filed on Apr. 27, 2000, both of which are incorporated herein in their entirety.

FIELD OF THE INVENTION

The present invention relates to a display member having metallic luster. More particularly, the present invention relates to a flexible display member having metallic luster, which can be applied as an exterior surfacing material of automobiles, motorcycles, etc. while conforming to various curved surfaces.

BACKGROUND OF THE INVENTION

A display member such as an emblem, that is attached to the vehicle body of an automobile, has hitherto been produced, for example, by plating a substrate made of a rigid resin, such as ABS resin, with chromium. However, since such a display member is entirely rigid because of its rigid substrate and has poor flexibility, it is produced so as to correspond with a curvature of the adherend surface. Therefore, it was impossible to apply it on the surface having a different curvature. That is, a new display member having the different curvature, corresponding with that of the adherend surface, had to be produced.

To solve such a problem, it has been suggested to impart the flexibility to an entire display member by using a flexible resin as the substrate. For example, Japanese Unexamined Patent Publication (Kokai) No. 9-152838 has suggested a flexible decorative mark having a lustrous color formed by attaching a decorative film provided with a metallic vapor deposition layer onto a flexible substrate. The flexible decorative mark can be applied on the respective surfaces of automobiles while conforming to them because the entire flexible decorative mark is formed of a flexible material.

Japanese Unexamined Patent Publication (Kokai) No. 11-50026 has suggested a structural member for three-dimensional display, which is produced by laying a flexible base layer made of a thermoplastic synthetic resin sheet on the back surface of a thermoplastic synthetic resin film having a metallic lustrous film on its back surface, and punching the resulting laminate into a predetermined shape. This structural member can conform to various curved surfaces because the entire structural member is formed of a flexible material.

SUMMARY OF THE INVENTION

In the flexible decorative mark disclosed in Japanese Unexamined Patent Publication (Kokai) No. 9-152838, tin, chromium, aluminum, and silver are listed as the metal constituting the metallic vapor deposition layer. However, the following problem arises when using these metals as the metallic vapor deposition layer. Since an end portion of the metallic vapor deposition layer is exposed at an end portion of the flexible decorative mark and tin is essentially soluble in an alkali, the end portion is corroded by an acid or an alkali and the corrosion proceeds into the layer. Since chromium exhibits a darker metallic luster than that in case of tin, thus obtaining no appearance with good bright metallic luster, and is inferior in malleability, there arises whitening at the portion where the film is drastically stretched on forming of the decorative mark, i.e. a phenomenon that the color of the metal itself changes. In the case of aluminum, the appearance with good bright metallic luster can be obtained, but whitening is liable to arise on forming and corrosion is liable to arise under the conditions on use. Also in the case of silver, the appearance with good bright metallic luster can be obtained, but darkening is caused by the reaction with sulfur in the air and, furthermore, the acid resistance and alkali resistance are poor, similar to tin.

In the structural member for three-dimensional display disclosed in Japanese Unexamined Patent Publication (Kokai) No. 11-50026, it is suggested to use tin or indium as the metal because the appearance is impaired by corrosion when using aluminum as the metallic lustrous film. However, when using tin as the metal, there also arises the problem of corrosion as described above. Further, the tin vapor deposition layer itself tends to be easily destroyed and suffers from severe defects such as plastic film delaminating after natural weathering testing, salt water spray testing, water soak testing, moisture resistance testing, and so on, due to the aggregated fine structure of the tin vapor deposition layer and the lack of tin cohesion after water soak testing. Furthermore, in the structural member for three-dimensional display, the metal is vapor deposited so that the metal has a visible ray transmittance of 8 to 17%, thereby to form a metallic lustrous film. However, when the visible ray transmittance is high, such as 8% or more, the color of the base layer disposed under the metallic lustrous layer, the color of the adhesive layer disposed under the base layer or the color of the surface of the adherend; to which the three-dimensional display member is applied, can be seen through, and a desired metallic color tone can not be reproduced sometimes due to an influence of these colors. Since the three-dimensional display member is produced by laying the base layer on the thermoplastic synthetic resin film having the metallic lustrous film to form a laminate, and punching the laminate into a desired shape, the shape of the cross section of the resulting structural member is merely a shape of a layer and it is impossible to present a complicated three-dimensional shape. The area of the exposed portion increases at the end portion and, therefore, the metallic lustrous layer is likely to be corroded.

An object of the present invention is to solve the problems described above and to provide a three-dimensional display member which is flexible and superior in curved surface conformability and durability, and which can present various three-dimensional shapes.

According to the present invention, the above object can be attained by a display member having metallic luster, comprising a substrate, a metallic layer and a transparent layer in this sequence, said display member further comprising an adhesive layer on the side opposite to the metallic layer on the substrate, the metallic layer being an indium vapor deposition film provided on the surface of the transparent layer, the indium vapor deposition film having a visible ray transmittance of not more than 6% and a thickness of not more than 600 angstroms.

As a result of various studies about the metal constituting the metallic layer, according to the display member of the present invention, excellent durability such as weathering resistance, salt water resistance, acid resistance, alkali resistance, water resistance, and moisture resistance can be imparted by using indium and a desired metallic color tone can be reproduced and, furthermore, the corrosion resistance can be improved by adjusting the visible layer transmittance of the metallic layer to 6% or less and adjusting the thickness to 600 angstroms or less. The entire three-dimensional display member can be made flexible and the curved surface conformability can be imparted by using a flexible thermoplastic resin as the substrate and, furthermore, the three-dimensional appearance can be imparted by forming the substrate by the injection molding.

DETAILED DESCRIPTION OF THE INVENTION

Figure 1:
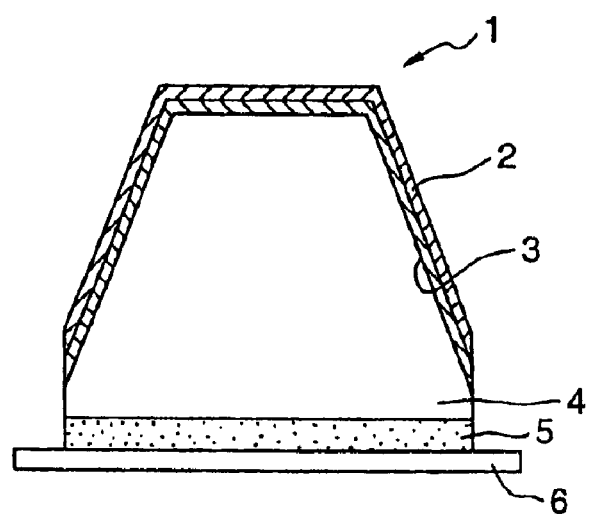
FIG. 1 is sectional view showing one embodiment of the display member having metallic luster according to the present invention.
Figure 2:
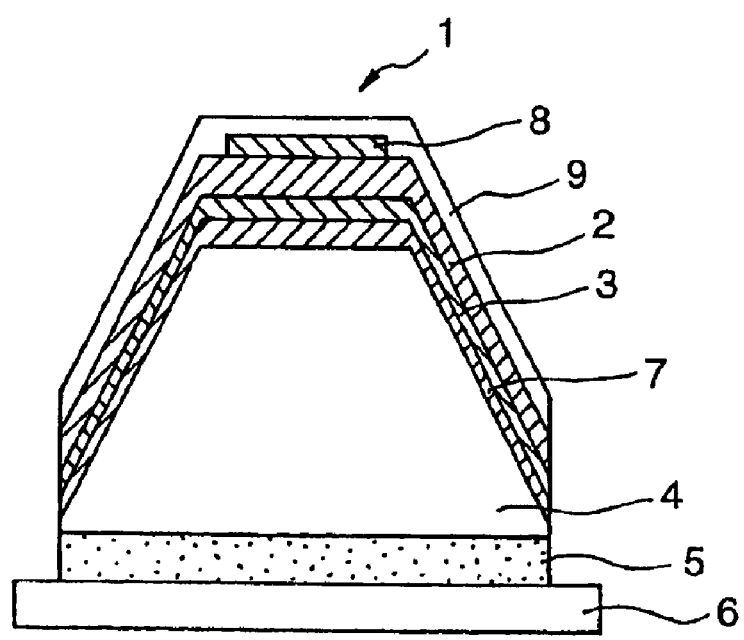
FIG. 2 is sectional view showing another embodiment of the display member having metallic luster according to the present invention.

FIG. 1 is sectional view showing one preferred embodiment of the display member according to the present invention. FIG. 2 is sectional view showing another preferred embodiment of the display member according to the present invention. As shown in FIG. 1, a display member 1 comprises a substrate formed of a flexible resin having a predetermined three-dimensional shape, a metallic layer 3 and a transparent layer 2 in this sequence, said display member further comprising an adhesive layer 5 on the side opposite to the metallic layer 3 on the substrate.

As the material constituting the transparent layer 2, thermoplastic resins which are colorless or colored and which are transparent and flexible are required. For example, there can be used flexible vinyl chloride resin, fluororesin, urethane resin, silicone resin, polyester resin, and olefinic resin such as polyethylene, polypropylene and ionomer resin. The thickness of the transparent layer 2 is preferably within a range from about 10 to 150 $\mu$m, When the thickness is smaller than 10 $\mu$m, the film is liable to be broken in the forming step of the display member described below. On the other hand, the thickness larger than 150 $\mu$m is not required because of the forming step and constitution of the display member. If the transparent layer 2 is colorless and transparent, it is possible to impart the appearance of good metallic luster of indium, which is vapor deposited on the back surface thereof, to the display member. Since indium has a bright silver color, a desired color that is different from that of indium itself (e.g. golden color) can be developed by coloring the transparent layer 2 due to incorporation of a transparent pigment. Since chromium used conventionally in this metallic layer has a darkish color, a desired color could not be developed even if the transparent pigment was incorporated into the transparent layer 2.

Various additives such as ultraviolet absorbers, photostabilizers and antioxidants can be incorporated into the transparent layer 2 to improve the performances under the conditions on use of the display member. To improve the processability on film formation of the transparent layer 2, leveling agents such as silicone resin, fluororesin and acrylic resin, lubricants, and auxiliary film forming agents may be incorporated. The transparent layer 2 may be composed of not only a single resin, but also a composite film formed by a combination of resins having different materials. To improve the adhesion of the indium vapor deposition film described below, a primer such as urethane resin, silicone resin, epoxy resin, and polyester resin may be coated previously. Furthermore, the surface to be vapor deposited may be previously subjected to a plasma treatment or corona treatment.

The metallic layer 3 can be formed on one major surface of the transparent layer 2 by vapor depositing indium by a heating method such as high-frequency dielectric heating, electron beam method, etc., using a conventional vacuum vapor deposition device for plastic film. It is necessary that the visible ray transmittance of the metallic layer 3 is not more than 6%. When the visible ray transmittance is larger than 6%, the substrate disposed under the lower lamination is seen through the metallic layer 3 and desired metallic luster is hardly developed. The thickness of the metallic layer 3 is not more than 600 angstroms, and preferably within a range from 300 to 600 angstroms. Even if the thickness is larger than 600 angstroms, predetermined metallic luster does not change and the cost becomes higher because indium itself is an expensive substance. When the thickness is larger than 600 angstroms, the corrosion resistance is lowered. On the other hand, when the thickness is smaller than 300 angstroms, the substrate disposed under the lower lamination is seen through the indium deposited layer 3 and the appearance becomes poor.

The substrate 14 constitutes a major portion of the structure of the three-dimensional display member. Therefore, it is preferable that the substrate 4 is composed of a flexible resin to make the entire three-dimensional display material 1 flexible. As the flexible resin, thermoplastic resin such as flexible vinyl chloride resin, urethane resin and thermoplastic elastomer can be used. The substrate 4 can be provided in a predetermined three-dimensional shape by putting the layer 2 provided with the metallic layer 3 as the indium vapor deposition film in a die, and injecting the above resin on the metallic layer 3 using an injection molding method such as hot melt injection molding, two-components mixing type reaction injection molding, etc. Alternatively, the preform having a predetermined shape formed from the above flexible resin by injection molding may be contact-bonded with the layer 2 provided with the metallic layer 3. In the display material of the present invention, since the substrate 4 is formed by injection molding in such way, it is possible to present a complicated design that is hardly presented by punching. Exposure of the metallic layer 3 can be reduced as possible by coating the layer 2 provided with the metallic layer so as to coat the end portion of the substrate 4, thus making it possible to avoid risk of corrosion of the metallic layer 3. The thickness of the substrate 4 varies depending on the design of the required display material, but is within a range from about 0.5 to 10 mm when using in an emblem product for general automobile exteriors. To improve the performances, various additives such as ultraviolet absorbers, photostabilizers and antioxidants may be incorporated into the resin used in the substrate 4.

In such way, the substrate 4 may be directly contact-bonded with the layer 2 provided with the metallic layer 3, but an adhesive resin layer 7 made of a polyamide, nylon, polyurethane, vinyl chloride or vinyl acetate resin may be provided between the metallic layer 3 and the substrate 4 to protect the metallic layer 3 and/or to improve the adhesion with the substrate up to the forming step after the step of providing the metallic layer 3, as shown in FIG. 2. The thickness of the adhesive resin layer 7 is preferably within a range from 2 to 100 $\mu$m. When the thickness is smaller than 2 $\mu$m, the adhesion is lowered. On the other hand, even if the thickness is larger than 100 $\mu$m, a predetermined effect can not be obtained and the material is useless. Furthermore, the resulting entire three-dimensional display member becomes thick, resulting in poor processability.

As the lower lamination of the substrate layer 4, i.e. an adhesive layer provided on the side opposite to the metallic layer 3, for example, an acrylic adhesive, a rubber adhesive or a silicone adhesive can be used. A double-coated tape having a foam layer, such as acrylic foam tape, urethane foam tape, etc. can also be used. The thickness of the adhesive layer 5 is usually within a range from about 0.1 to 1.2 mm. When the thickness is smaller than 0.1 mm, it becomes difficult to adhere to the adherend. Even if the thickness is larger than 0.5 mm, the effect of improving the adhesion is not obtained and the material is useless. Furthermore, the resulting entire display member becomes thick, resulting in poor processability. To protect the adhesive layer 5, a release paper or film 6 whose one surface is subjected to a release treatment is usually provided. The adhesive layer 5 and release paper 6 may be simultaneously provided by separately preparing an adhesive layer with a release paper, wherein a coated adhesive layer is provided on a release surface of a release paper, and dry-laminating the adhesive layer with a substrate 4.

On the outermost surface of the display member thus obtained, that is, surface of the transparent layer 2, a clear coat layer 9 made of an acrylic resin or a fluororesin may be provided in order to prevent scratching and to improve the weathering resistance. The thickness of the clear coat layer is preferably within a range from 10 to 60 $\mu$m. When the thickness is smaller than 10 $\mu$m, a desired protection effect can not be obtained. On the other hand, even if the thickness is larger than 60 $\mu$m, a desired effect can not be obtained and the material is useless. Furthermore, the resulting entire display member becomes thick, resulting in poor processability. In accordance with design requirements, a colored layer 8 having a desired shape may be provided on the surface of the layer 2 by means of digital printing, screen printing, spray coating, and transfer due to hot stamp. The thickness of the colored layer 8 is preferably within a range from 2 to 50 $\mu$m. When the thickness is smaller than 2 $\mu$m, a desired coloration effect can not be obtained. On the other hand, even if the thickness is larger than 50 $\mu$m, an improvement in desired effect can not be obtained and the material is useless. Furthermore, the resulting entire display member becomes thick, resulting in poor processability. In case this colored layer 8 is provided, the above clear coat layer 9 is required to protect the colored layer 8. On the outermost surface of the display member, a publicly known surface protective tape may be applied to protect the surface on storage, transfer and application on the adherend.

EXAMPLES

Example 1

A polyester polyol (DESMOPHENE™ 670, manufactured by SUMITOMO BYER URETHANE Co., Ltd.) and yellowing-free type polyisocyanate (SUMIJULE™ N3300, manufactured by SUMITOMO BYER URETHANE Co., Ltd.) were mixed in an equivalent amount, and then the mixture was extruded to produce a colorless and transparent polyester urethane film having a thickness of 50 $\mu$m. Indium was vacuum-deposited on one surface of the polyester urethane film in the thickness of about 400 angstroms to form a laminated film. The visible ray transmittance of the laminated film was measured in accordance with JIS A 5759. As a result, it was 5%. The laminated film was disposed in a die for in-mold decorating so that the indium vapor deposition layer being disposed at the injection resin side, and then a predetermined amount of a liquid resin prepared by mixing of a polyester polyol which is two parts polyurethane resin and a dicyclohexylmethane-4,4'-diisocyanate prepolymer in an equivalent amount was injected into the die. The polyester polyol was reacted with the dicyclohexylmethane-4,4'-diisocyanate prepolymer to form a substrate, and then the die was opened to obtain an intermediate preform. An acrylic foam tape #4215 manufactured by SUMITOMO 3M Co., Ltd. was laid on the lower surface of the substrate resin of the intermediate preform. Finally, an unnecessary laminated film, burr of the substrate resin, and an unnecessary acrylic foam tape are trimmed to obtain a display member of the present invention.

Example 2

A fluororesin (YHV200P™ (TFE:HFP:VDF=40:20:40), manufactured by DYNEON Co.) was extruded to produce a colorless and transparent fluorine-based film having a thickness of 30 $\mu$m. Indium was vacuum-deposited on one surface of the film in the thickness of about 400 angstroms to form a laminated film. The visible ray transmittance of the laminated film was measured in accordance with JIS A 5759. As a result, it was 5%. Using the same step and material as those in Example 1, a display member of the present invention was produced.

Indium was vacuum-deposited on one surface of the colorless and transparent polyester urethane film having a thickness of 50 $\mu$m produced in Example 1 in the thickness of about 500 angstroms to form a laminated film. The visible ray transmittance of the laminated film was measured in accordance with JIS A 5759 to be 2%. Using the same step and material as those in Example 1, a display member was produced.

Comparative Example 1

Aluminum was vacuum-deposited on one surface of the colorless and transparent polyester urethane film having a thickness of 50 $\mu$m produced in Example 1 in the thickness of about 500 angstroms to form a laminated film. Using the same step and material as those in Example 1, a display member was produced.

TABLE 1

|  | Deposited metal | Appearance | Whitening on forming |
|---|---|---|---|
| Example 1 | Indium | Good metallic luster | Not occurred |
| Example 2 | Indium | Good metallic luster | Not occurred |
| Example 3 | Indium | Good metallic luster | Not occurred |
| Comp. Example 1 | Aluminum | Good metallic luster | Slight whitening occurred |
| Comp. Example 2 | Chromium | Dark color tone | Whitening occurred |
| Comp. Example 3 | Tin | Good metallic luster | Not occurred |
| Comp. Example 4 | Indium | Good metallic luster but high transmittance | (not carried out) |
| Comp. Example 5 | Indium | Good metallic luster | Not occurred |

Then, these display members were subjected to various tests as described below. The results are shown in Table 2 below.

Test Procedures

Outdoor exposure: Three-dimensional display members were exposed at the position in a direction of 45° due south from Fuji-shi, Shizuoka-ken for one year.

Acid resistance: Three-dimensional display members were dipped in an aqueous sulfuric acid solution (0.05 mol/liter) at 20° C. for 24 hours.

Alkali resistance: Three-dimensional display members were dipped in an aqueous sodium hydroxide solution (0.1 mol/liter) at 20° C. for 8 hours.

Salt water spray resistance: An aqueous 5% sodium chloride solution was sprayed over three-dimensional display members at 40° C. for 336 hours.

Water resistance: Three-dimensional display members were dipped in water at 40° C. for 168 hours.

Moisture resistance: Three-dimensional display members were allowed to stand in an atmosphere under the conditions of 50° C. and 95% RH for 168 hours.

Evaluation Procedures

Appearance: It is visually evaluated.

Adhesion: It is evaluated by Checkers Taping Method (8.5.2) of Adhesion (8.5) defined in JIS K5400. The checkers have a distance of 2 mm. With respect to corroded test specimens, the adhesion test at the non-corroded place was conducted.

Evaluation Criteria

Appearance:
A: No change in initial appearance is observed.
B: Corrosion is observed at end.
C: Corrosion proceeds into the display member from the end.

Adhesion: Evaluation scores based on the evaluation criteria of Checkers Taping Method (8.5.2) of Adhesion (8.5) defined in JIS K5400.
Scores 10: No peel-off
Scores 8: Peel-off in proportion of 5% or less
Scores 6: Peel-off in proportion of 5 to 15%
Scores 4: Peel-off in proportion of 15 to 35%
Scores 2: Peel-off in proportion of 35 to 65%
Scores 0: Peel-off in proportion of 65% or more

TABLE 2

| | Outdoor exposure | | Acid resistance | | Alkali resistance | | Salt water spray resistance | |
|---|---|---|---|---|---|---|---|---|
| | Appearance | Adhesion | Appearance | Adhesion | Appearance | Adhesion | Appearance | Adhesion |
| Ex. 1 | A | 10 | A | A | A | A | A | 10 |
| Ex. 2 | A | 10 | A | A | A | A | A | 10 |
| Ex. 3 | A | 10 | A | A | A | A | A | 10 |
| Comp. Ex. 1 | C | 10 | C | C | C | C | B | 10 |
| Comp. Ex. 2 | A | 10 | A | A | A | A | A | 10 |
| Comp. Ex. 3 | B | 4 | B | B | C | C | B | 4 |
| Comp. Ex. 5 | C | 10 | C | C | B | B | C | 10 |

| | Water resistance | | Moisture resistance | |
|---|---|---|---|---|
| | Appearance | Adhesion | Appearance | Adhesion |
| Example 1 | A | 10 | A | 10 |
| Example 2 | A | 10 | A | 10 |
| Example 3 | A | 10 | A | 10 |
| Comp. Example 1 | A | 10 | A | 10 |
| Comp. Example 2 | A | 10 | A | 10 |
| Comp. Example 3 | A | 0 | A | 0 |
| Comp. Example 5 | A | 10 | A | 10 |

According to the present invention, there can be obtained a display member of the present invention, which is flexible and superior in curved surface conformability and durability, and which can present various shapes, by forming a metallic layer by vapor depositing indium, and adjusting the thickness of the metallic layer to a predetermined thickness.

I claim:

1. A flexible display member having metallic luster, said display member comprising a substrate, a transparent layer and a metallic layer positioned between the substrate and the transparent layer, said display member further comprising a first adhesive layer on the substrate opposite the metallic layer and a second adhesive layer between the metallic layer and the substrate, wherein the second adhesive layer has a thickness ranging from about 2 to about 100 μm, the metallic layer being an indium vapor deposition film provided on the transparent layer, the indium vapor deposition film having a visible ray transmittance of not more than 6% and a thickness of not more than 600 angstroms.

2. The flexible display member having metallic luster according to claim 1, wherein said substrate has a thickness ranging from about 0.5 to about 10 mm.

3. The flexible display member having metallic luster according to claim 1, wherein said transparent layer has a thickness ranging from about 10 to about 150 μm.

4. The flexible display member having metallic luster according to claim 1, wherein the first adhesive layer comprises an acrylic adhesive, a rubber adhesive, or a silicone adhesive.

5. The flexible display member having metallic luster according to claim 1, wherein the first adhesive layer comprises an acrylic foam tape or a urethane foam tape.

6. The flexible display member having metallic luster according to claim 1, wherein the indium vapor deposition film has a thickness of not less than 300 angstroms.

7. The flexible display member having metallic luster according to claim 1, further comprising a colored layer on said transparent resin layer.

8. The flexible display member having metallic luster according to claim 1, further comprising a clear coat layer on said transparent resin layer.

9. The flexible display member having metallic luster according to claim 1, wherein said transparent resin layer contains pigment.

10. The flexible display member having metallic luster according to claim 1, further comprising a release liner over the first adhesive layer.

11. The flexible display member having metallic luster according to claim 1, wherein said substrate comprises a predetermined three dimensional shape formed from a flexible resin, and said transparent layer comprises a thermoplastic resin.

12. The flexible display member having metallic luster according to claim 11, wherein said substrate comprises vinyl chloride resin, urethane resin, a thermoplastic elastomer, or a combination thereof.

13. The flexible display member having metallic luster according to claim 11, wherein said transparent layer comprises vinyl chloride resin, fluororesin, urethane resin, silicone resin, polyester resin, polyethylene, polypropylene, ionomer resin, or a combination thereof.

14. A flexible display member having metallic luster, said display member comprising a substrate, a transparent layer and a metallic layer positioned between the substrate and the transparent layer, said display member further comprising a first adhesive layer on the substrate opposite the metallic layer, the metallic layer being an indium vapor deposition film provided on the transparent layer, the indium vapor deposition film having a visible ray transmittance of not more than 6% and a thickness of not more than 600 angstroms, wherein the first adhesive layer has a thickness ranging from about 0.1 to about 1.2 mm.

15. The flexible display member having metallic luster according to claim 14, further comprising a release liner over the first adhesive layer.

16. A flexible display member having metallic luster, said display member comprising a substrate, a transparent layer and a metallic layer positioned between the substrate and the transparent layer, said display member further comprising a first adhesive layer on the substrate opposite the metallic layer, the metallic layer being an indium vapor deposition film provided on the transparent layer, the indium vapor deposition film having a visible ray transmittance of not more than 6% and a thickness of not more than 600 angstroms, said display member further comprising a second adhesive layer between the metallic layer and the substrate, wherein the second adhesive layer comprises a polyamide, nylon, polyurethane, vinyl chloride, or vinyl acetate resin.

17. The flexible display member having metallic luster according to claim 16, further comprising a release liner over the first adhesive layer.

18. A flexible display member having metallic luster, said display member comprising a substrate, a transparent layer and a metallic layer positioned between the substrate and the transparent layer, said display member further comprising a first adhesive layer on the substrate opposite the metallic layer, the metallic layer being an indium vapor deposition film provided on the transparent layer, the indium vapor deposition film having a visible ray transmittance of not more than 6% and a thickness of not more than 600 angstroms, wherein end portions of the display member are coated to avoid risk of corrosion of the metallic layer.

19. The flexible display member having metallic luster according to claim 18, further comprising a release liner over the first adhesive layer.

* * * * *

UNITED STATES PATENT AND TRADEMARK OFFICE
CERTIFICATE OF CORRECTION

PATENT NO. : 6,942,911 B2  
APPLICATION NO. : 10/258685  
DATED : September 13, 2005  
INVENTOR(S) : Akihiko Nakayama It is certified that error appears in the above-identified patent and that said Letters Patent is hereby corrected as shown below:

Column 2,
Line 31, after "adherend" delete ";".

Column 5,
Line 5, after "from" delete ",".

Column 6,
Line 39, after "member was produced." insert the following paragraphs:

-- Comparative Example 2

Chromium was vacuum-deposited on one surface of the colorless and transparent polyester urethane film having a thickness of 50 μm produced in Example 1 in the thickness of about 500 angstroms to form a laminated film. Using the same step and material as those in Example 1, a display member was produced.

Comparative Example 3

Tin was vacuum-deposited on one surface of the colorless and transparent polyester urethane film having a thickness of 50 pm produced in Example 1 in the thickness of about 500 angstroms to form a laminated film. Using the same step and material as those in Example 1, a display member was produced.

Comparative Example 4

Indium was vacuum-deposited on one surface of the colorless and transparent polyester urethane film having a thickness of 50 μm produced in Example 1 in the thickness of about 200 angstroms to form a laminated film. The visible ray transmittance of the laminated film was measured in accordance with JIS A 5759. As a result, it was 11%. The laminated film thus obtained had the appearance with metallic luster but is entirely see-through, and was not suited for use as the three-dimensional display member of the present invention.

UNITED STATES PATENT AND TRADEMARK OFFICE
CERTIFICATE OF CORRECTION

PATENT NO. : 6,942,911 B2
APPLICATION NO. : 10/258685
DATED : September 13, 2005
INVENTOR(S) : Akihiko Nakayama It is certified that error appears in the above-identified patent and that said Letters Patent is hereby corrected as shown below:

Comparative Example 5
Indium was vacuum-deposited on one surface of the colorless and transparent polyester urethane film having a thickness of 50 μm produced in Example 1 in the thickness of about 650 angstroms to form a laminated film. Using same step and material as those in Example 1, a display member was produced.
A comparison in appearance between the three-dimensional display members thus produced was made. The results are summarized in Table 1 below. --.

Signed and Sealed this

Twenty-ninth Day of April, 2008

JON W. DUDAS
*Director of the United States Patent and Trademark Office*